UNITED STATES PATENT OFFICE 2,537,098

SULFONAMIDE AZO COUPLING COMPONENTS USED IN DIAZO TYPES

Sam Charles Slifkin and Thaddeus J. Trojnar, Binghamton, N. Y., assignors to General Aniline & Film Corporation, New York, N. Y., a corporation of Delaware No Drawing. Application April 12, 1946, Serial No. 661,865

8 Claims. (Cl. 95—6)

The present invention relates to light-sensitive diazotype materials and more particularly to the azo component employed in such materials.

In general, the diazotype process involves the sensitization of a base, such as paper or the like, with a composition containing a light-sensitive diazo compound and an azo component capable of coupling in an alkaline medium with the diazo component, exposing the sensitized base through a pattern, and developing the exposed material by means of an alkali, preferably ammonia vapors.

In the manufacture of the diazotype materials, the diazo compound and the coupler are usually applied to the base from a solution. Most frequently water is used as the solvent, although a mixture of water and organic solvents, or organic solvents alone may be employed, particularly with bases other than paper. The coupler utilized must be sufficiently water-soluble to go in solution. For couplers possessing sufficient water-solubility, it has been customary to employ couplers which are sulfonated. Sulfonated couplers present other advantages, in being commercially available and in possessing a decreased coupling energy. Because of the latter property, precoupling is minimized and the diazotype materials have a better shelf-life than the case where unsulfonated couplers are employed.

However, the sulfonated compounds are accompanied by certain inherent disadvantages. Often the presence of the sulfonic acid group in the dye formed when the component couples with the diazo compound, decreases the wash-fastness of the prints obtained so as to make them impractical. When coming in contact with water, such a print runs and smears. Another disadvantage of such couplers is that the presence of the sulfonic acid group, which is a strong polar group, decreases the solubility of the coupler in non-polar organic solvents. Furthermore, the couplers possessing a sulfonic acid group exhibit a greatly decreased substantivity for cellulose ester films and fibers, as for example, cellulose acetate and the like.

It is accordingly among the objects of the present invention to provide diazotype light-sensitive compositions and materials which will yield dye images of excellent water-fastness.

It is a further object of the invention to provide couplers which are readily soluble in both aqueous and organic solvents and which exhibit an increased substantivity for cellulose ester films or fibers, as compared with couplers possessing sulfonic acid groups.

According to our invention we overcome the defects present in couplers having sulfonic acid groups, by preparing light-sensitive diazo materials with couplers which can be represented by the following formula:

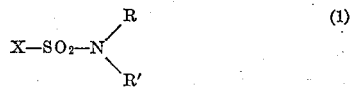

In the above formula, X stands for any organic nucleus capable of coupling in one or more positions, such as the nuclei of phenols, naphthols, aromatic amines and substances having reactive methylene groups; R and R' stand for hydrogen, alkyl, alkylol or the like, as for example, methyl, ethyl, propyl, butyl, amyl, or the like; and hydroxyethyl, hydroxypropyl, hydroxybutyl, and the like. The following are examples of compounds coming within the above formula.

4 - (acetoacetamido) - benzenesulfonamide, which may be represented by the following formula:

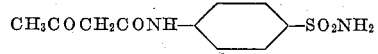

3-(3'-methyl-pyrazolone - 5) - benzenesulfonamide which may be represented by the following formula:

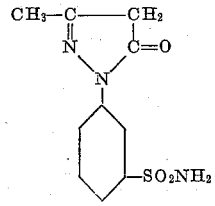

6,7-dihydroxy naphthalene-2(N - β-hydroxyethyl sulfonamide) which may be represented by the following formula:

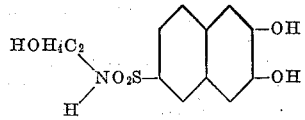

4-(acetoacetamido)-N-ethyl benzensulfoamide, and 3-(3'-methyl-pyrazolone-5) - N - hydroxypropyl benzensulfonamide.

The couplers coming under the Formula I can be readily prepared by condensing in molecular proportions the sulfochlorides having the formula $XSO_2Cl$, where X has the same significance as above, with ammonia, alkylamines, or alkylol-amines, in the presence of an alkali, such as sodium hydroxide.

The coupling components are utilized with the diazo compounds usually employed in the diazotype art as, for example, the aromatic diazonium chlorides as such, or in the form of their sulfates, sulfonates or their double chlorides with cadmium chloride, tin chloride, zinc chloride, boronfluoride, and the like. Examples of diazo compounds that may be employed are zinc chloride double salt of p-diazo-N-dimethyl aniline, the zinc chloride double salt of p-diazo-N-dimethyl m-toluidine, the zinc chloride double salt of p-diazo-N-methyl aniline, the boronfluoride double salt of the diazo of 4-amino 1-monoethylamino toluene, the sodium diazo sulfonate of 1-dimethylamino 3-methoxy - 4 - aminobenzene, the sulfate of the diazo from p-amino diphenylamine, the zinc chloride double salt of 4-ethylamino-3-methyl benzene-1-diazonium chloride, and the like.

To the sensitizing compositions there can also be made various additions, as metal salts for intensifying the dyestuff image such as aluminum sulfate, titanium ammonium chloride, nickel sulfate, and the like; stabilizing agents such as thiourea, thiosinamine, naphthalene trisulfonic acid and its salts, and the like. To prevent precoupling of the components, there may be employed restraining agents as, for example, citric acid, tartaric acid, boric acid, sulfosalicylic acid, and the like. If desired, hydroscopic agents, such as glycol, glycerin, dextrin and similar products may be employed in the sensitizing composition.

In general, the concentrations of the coupler employed varies widely depending on whether the coupler is employed alone or for shading in combination with other couplers and whether the coupling rate is fast or slow. In general, it may be employed in a range of concentration up to about 5% based on the sensitizing composition.

The base to which the sensitizing compositions are applied can be in the form of a sheet, film or web or any of the usual film forming materials, such as, paper, regenerated cellulose, cellulose ethers, such as cellulose ethylether; cellulose esters, such cellulose acetate, cellulose propionate, cellulose butyrate, and the like; linear super polymers such as linear superpolyamides, linear superpolyesters, linear superpolyurethanes, and similar products generically designated as nylon.

We have found, however, that the couplers coming under our generic formula are particularly effective when applied to bases prepared from cellulose esters, such as cellulose acetate, since the coupler in the sensitizing composition and the dye image obtained on exposure and development have excellent substantivity for cellulose esters.

Being soluble in water, in organic solvents, and in aqueous mixtures of organic solvents, the sensitizing compositions containing our novel couplers may be employed from either type of solution. If desired, the sensitizing compositions may be applied from a solution which exerts a swelling action on the cellulose ester base as, for example, solutions comprising methyl alcohol, ethyl alcohol, isopropyl alcohol, acetone, methyl glycol, or any of the other well-known swelling agents for cellulose esters. Such a treatment improves the susceptibility of the esters to penetration by the sensitizing solution.

Our invention may be further illustrated by the following examples but it is to be understood that it is not restricted thereto.

Example 1

A solution is made up of the following ingredients:

60 cc. of water,
30 cc. of isopropyl alcohol,
5 grams of citric acid,
2 grams of thiourea,
2 grams of 4-(acetoacetamido) - benzenesulfonamide, and
4 grams of the zinc chloride double salt of p-diazo-N-dimethyl aniline.

The solution is applied in excess on a cellulose acetate sheeting, the excess removed by a doctor blade, and the sensitive layer formed on the paper is then dried with warm air. Upon exposing the sensitized material through a pattern and developing the same with ammonia vapor, a dye image is obtained which is orange in color and exhibits excellent wash-fastness.

Example 2

A solution is prepared from 60 cc. of water, 30 cc. of isopropyl alcohol,
5 grams of sulfosalicylic acid,
2 grams of thiourea,
2 grams of 3-(3'-methyl-pyrazolone-5)-benzenesulfonamide, and
4 grams of the zinc chloride double salt of p-diazo-N-dimethyl-m-toluidine.

This solution was employed to coat a sheet of cellulose acetate film in the same manner as in Example 1. When exposed under a pattern as described in Example 1, a red dye image of excellent wash-fastness is obtained.

Example 3

A sensitizing solution was prepared from the following ingredients:

60 cc. of water,
20 cc. of isopropyl alcohol,
5 grams of sulfosalicylic acid,
2 grams of thiourea,
10 grams of butanol-1,
2 grams of 6,7-dihydroxy naphthalene - 2 - (N-β-hydroxyethyl sulfonamide), and
4 grams of the zinc chloride double salt of p-diazo-N-dimethyl-m-toluidine.

This solution on application to a cellulose acetate base formed a sensitized layer which when exposed and developed with ammonia vapors as described in the previous examples, formed a blue image of excellent wash-fastness.

It will be understood that various modifications of the invention will be apparent to those skilled in the art and we, therefore, do not desire to be limited except as required by the appended claims.

We claim:

1. Light-sensitive diazotype materials comprising a light-sensitive diazo compound and as azo dye coupling components sulfonamides selected from the class consisting of 4-(acetoacetamido)-benzenesulfonamide, 3-(3'-methylpyrazolone - 5) - benzenesulfonamide, 6.7 - dihydroxy naphtalene-2-(N-β-hydroxyethyl sulfonamide), 4-(acetamido)-N-ethyl benzenesulfonamide, and 3-(3'-methyl-pyrazolone-5)-N-hydroxypropyl benzenesulfonamide.

2. Light-sensitive diazotype materials comprising a light-sensitive diazo compound and as an azo dye coupling component 4-(acetoacetamido)-benzenesulfonamide.

3. Light-sensitive diazotype materials comprising a light-sensitive diazo compound and as an azo coupling component 3-3'-methyl-pyrazolone-5)-benzenesulfonamide.

4. Light sensitive diazotype materials comprising a light-sensitive diazo compound and as an azo coupling component, 6,7-dihydroxy naphthalene-2-(N-β-hydroxyethyl sulfonamide).

5. A diazotype material comprising a support having a light-sensitive layer containing a light-sensitive diazo compound suitable for two component diazotypes and as azo coupling component a sulfonamide selected from the class consisting of 4-(acetoacetamido)-benzenesulfonamide, 3-(3'-methyl-pyrazolone-5)-benzenesulfonamide, 6,7-dihydroxy naphthalene-2-(N-β-hydroxyethyl sulfonamide), 4-(acetamido)-N-ethyl benzenesulfonamide, and 3-(3'-methyl-pyrazolone-5)-N-hydroxypropyl benzenesulfonamide.

6. A light-sensitive material comprising a cellulose ester support having a light-sensitive layer containing a light-sensitive diazo compound and as an azo dye coupling component 4-(acetoacetamido)-benzenesulfonamide.

7. A light-sensitive material comprising a cellulose ester support having a light-sensitive layer containing a light-sensitive diazo compound and as an azo coupling component 3 - (3'- methyl - pyrazolone - 5) - benzenesulfonamide.

8. A light-sensitive material comprising a cellulose ester support having a light-sensitive layer containing a light-sensitive diazo compound and as an azo coupling component 6,7-dihydroxy naphthalene-2-(N-β-hydroxyethyl sulfonamide).

SAM CHARLES SLIFKIN.
THADDEUS J. TROJNAR.

REFERENCES CITED

The following references are of record in the file of this patent:

UNITED STATES PATENTS

| Number | Name | Date |
|---|---|---|
| 1,857,920 | Lantz | May 10, 1932 |
| 2,298,444 | Weissberger | Oct. 13, 1942 |
| 2,353,205 | Vittum | July 11, 1944 |
| 2,342,620 | Woodward | Feb. 22, 1944 |
| 2,364,675 | Vittum | Dec. 12, 1944 |
| 2,432,549 | Von Glahn | Dec. 16, 1947 |

FOREIGN PATENTS

| Number | Country | Date |
|---|---|---|
| 331,459 | Great Britain | July 3, 1930 |